Aug. 4, 1942.　　　E. A. TROEGER　　　2,291,931
PROMPTING APPARATUS
Filed March 9, 1940　　　2 Sheets-Sheet 1
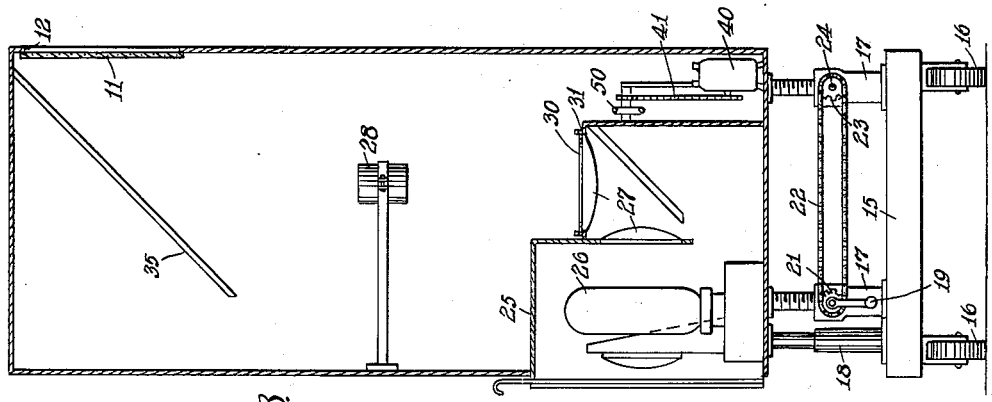
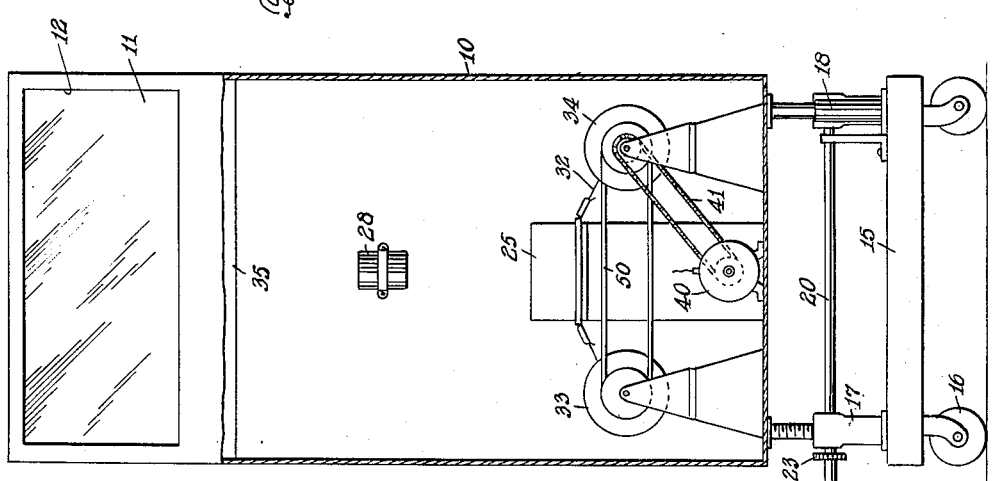
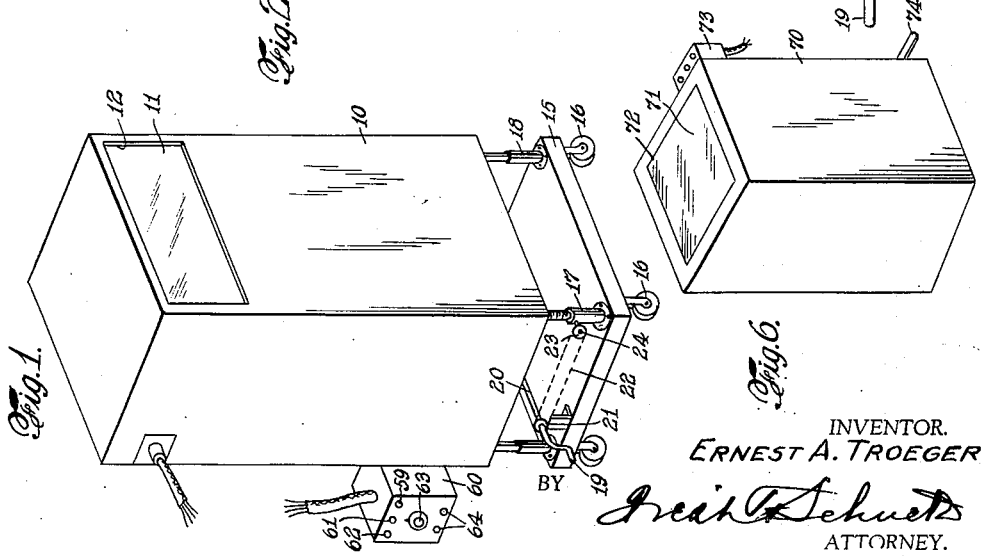
INVENTOR.
ERNEST A. TROEGER
BY
ATTORNEY.

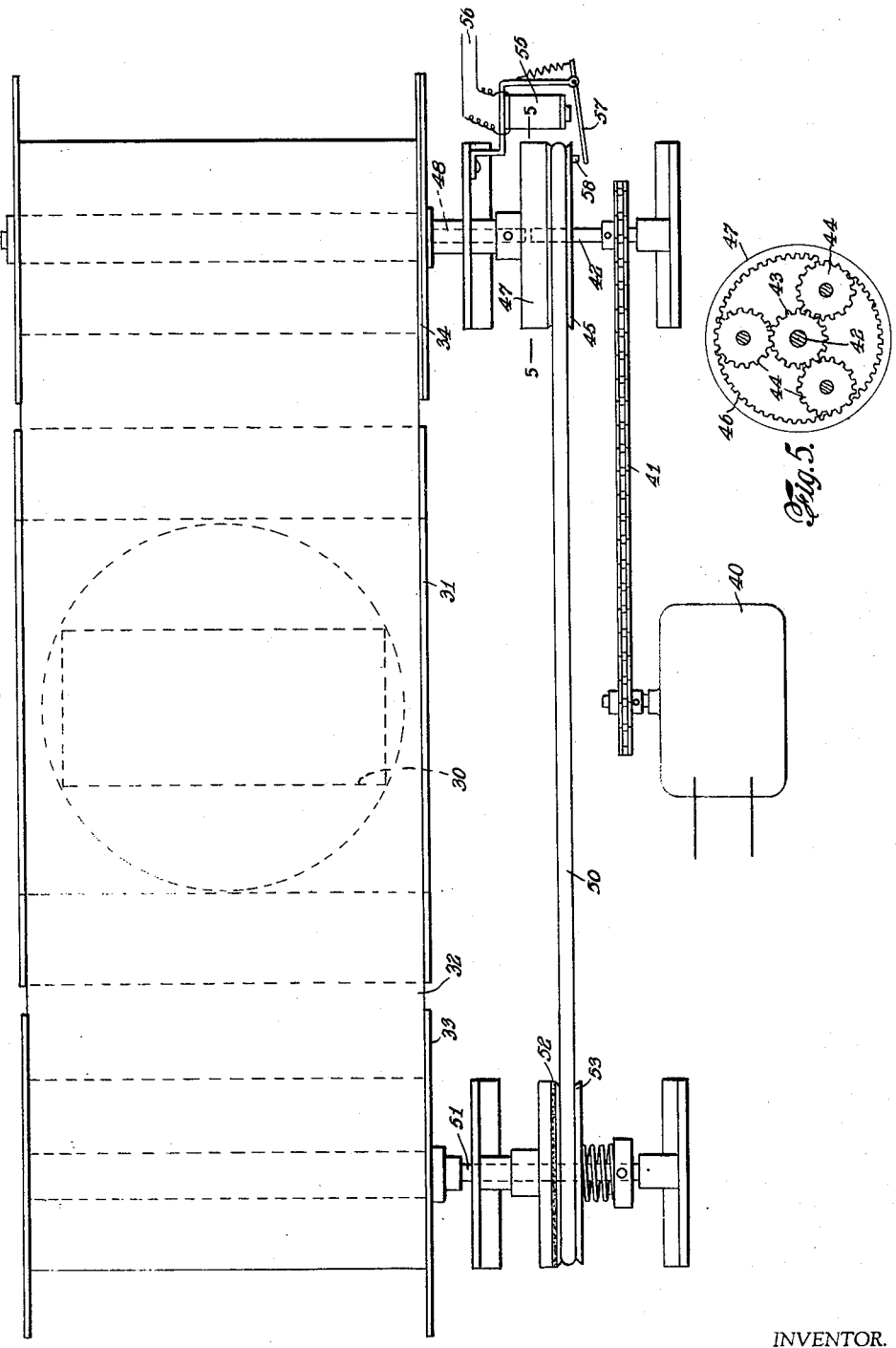

Patented Aug. 4, 1942

2,291,931

UNITED STATES PATENT OFFICE 2,291,931

PROMPTING APPARATUS

Ernest A. Troeger, Brooklyn, N. Y.

Application March 9, 1940, Serial No. 323,093

4 Claims. (Cl. 88—24)

The invention relates to apparatus suitable for use as a "silent prompter" means whereby a speaker, singer, actor, and the like may readily follow his lines and/or instructions.

The invention has for an object to provide means whereby the desired matter may be readily reproduced on a screen which is visible to the person being prompted but generally invisible to an audience.

A further object of the invention is to render the device suitable for use in the making of talking motion pictures of a player.

A still further object of the invention is to provide operating means under the immediate control of the performer or person being prompted or under the control of someone directing the performance.

Another object of the invention is to provide control means whereby the prompting may be interrupted at the will of the performer or a director; and, also, to provide means for controlling the rapidity of the promptings; also to enable rapid rewinding of a strip carrying the subject matter.

The invention has for another object means for adapting the prompting apparatus to the eye level of the performer.

In addition, the novel apparatus is readily adaptable to program timing in radio and television broadcasting.

In carrying out the invention, an embodiment is disclosed in the nature of a self-contained unit which includes, preferably, a suitable housing which may be of a nature intended for permanent installation such as a desk, pulpit or lectern, or as a portable type. This housing is designed to encase suitable projector apparatus for projecting matter, included on a roll of transparent or translucent strip of material, upon a translucent screen, for example, closing a window provided in the housing. The desired matter may be typed directly on the band of material, or applied thereto in any known manner.

The housing retains also suitable advancing mechanism for the strip of material so arranged that the strip may be moved in either direction before the projector and be controllable as to stopping and particular speed of the strip, as well as its direction of travel. Operation of this mechanism is under the control of means located, preferably, externally of the housing and in some instances at points remote therefrom, depending on the particular use to which the device is to be put. When the housing is not of the type designed for permanent location and with the screen in a more or less vertical plane, provision is made for adjusting the height of such screen relatively of a support for the housing to the proper eye level of the performer.

The nature of the invention, however, will best be understood when described in connection with the accompanying drawings, in which:

Fig. 1 shows, in perspective, the novel prompting apparatus.

Fig. 2 is an enlarged front elevation thereof, with a portion of the front wall broken away.

Fig. 3 is a side elevation with the side wall removed.

Fig. 4 is an enlarged plan view of the advancing mechanism for the strip of material designed to receive the reproducible matter.

Fig. 5 is a transverse section taken on the line 5—5, Fig. 4 of the drawings.

Fig. 6 shows, in perspective, a modified form of the apparatus.

Referring to the drawings, 10 designates a suitable cabinet or casing for housing the various mechanisms which include projector apparatus and driving means for advancing, as well as rewinding, a strip of film or band of transparent or translucent material upon which is located the matter designed to be reproduced. This matter is designed to be viewed, generally, upon a translucent screen 11 upon which it is projected from the transparent film, the said screen closing a window or aperture 12 located at the upper portion of the cabinet.

The cabinet, indicated in Fig. 1 of the drawings, is of a nature designed for location at a distance from the performer and out of the field of a camera or observers. The screen, however, remains constantly visible to the performer; and, in the particular embodiment shown, it is positioned substantially in a vertical plane for convenient observation by said performer, the matter displayed on the screen being under the control of the performer and/or one directing the performance.

To provide this screen at the proper eye-level suited to the particular performer, provision is made for adjusting the cabinet unit vertically relatively to a supporting platform 15 carried in turn by casters or other anti-friction members 16 whereby it is possible to readily move the cabinet as a whole to the required location. To this end, the said cabinet 10 is supported by the platform 15 upon a pair of diagonally disposed jacks 17 and a pair of similarly disposed spacer or guide members 18, the jacks being adjustable in well-known manner by operation of a crank-handle or the like 19 to adjust the cabinet to the desired elevation for locating the screen 11 to suit the performer. The arrangement is such that both of the diagonally located jacks are operated simultaneously, the crank-shaft 20 of the one jack being to this end provided with a sprocket wheel 21 which is connected through a sprocket chain 22 with a similar sprocket 23 on the crank-shaft 24 of the other jack.

Within the cabinet 10, preferably mounted on the bottom thereof, is the projection mechanism which comprises a lamp housing 25 with lamp 26 and suitable reflecting means for directing light rays through condensing lenses 27 and the lens system 28 carried from a wall of the cabinet.

The light-beam from the condensing lenses 27 is designed to pass through an aperture 30 in a film-gate or plate 31 and past which is designed to move, in the embodiment shown, a film strip or the like 32 of transparent material such as Celluloid ("Lumareith"), "Cellophane" and the like. This strip carries the matter to be reproduced and projected, being mounted upon a feed reel or spool 33 and adapted to be wound on a take-up reel or spool 34, said reels being located upon opposite sides of the aperture 30. The projected image is received on a reflector or mirror 35 which is supported in the upper portion of the cabinet and designed to reflect horizontally said projected matter upon the screen 11 to render it visible to a performer or observer.

The mechanism for feeding or advancing the strip from the feed roll past the aperture 30 includes an electrically driven motor 40 indicated as mounted on the bottom of the cabinet and connected with the driving shaft for the take-up reel through mechanism including the sprocket chain 41. The said shaft is divided axially, the portion 42 driven by the sprocket chain carrying a driving pinion 43 meshing with planetary gears 44 rotatably mounted on a pulley 45, rotatable on the said shaft portion. Gears 44, in turn, engage the internal gear 46 of a casing 47 mounted upon and rotatable with the other portion 48 of the driving shaft and affording the take-up reel shaft. A belt 50 connects the pulley 45 to shaft 51 of the feed reel through a friction disk 52 fixed to said shaft and a pulley 53.

By this expedient, the motor may be operated continuously in the same direction to advance the film strip as well as to cause the same to run in the opposite direction for rewinding the strip back upon the feed roll, provision being made to this end for holding temporarily or freeing the pulley 45 which carries the planetary gear. Thus, an electromagnet 55 may be operated at will from a remote point through the leads 56 to introduce a stop arm 57 into the path of rotation of a pin 58 extending from the pulley face. When the rotation of pulley 45 is checked, rotation will be communicated through casing 47 to the shaft portion 48 and at a reduced velocity; and when the pulley is free, it rotates to communicate rotation to shaft 51 through the belt 50, and at the motor speed.

A push-button or other circuit-controlling element 59 of a control box 60, which may be located at a point remote from the cabinet and under control of a performer or director, controls the circuit to electromagnet 55. This control box embodies also a push-button 61 for initiating rotation of the motor and stopping thereof and a button 62 for controlling the source of illumination 26. In addition, a rheostat (not shown) may be located within the control-box and included in the motor circuit, as is well understood, for operation by the control knob 63. Power for operating the motor may be introduced to the control box through the terminals 64 thereof.

Another form of the apparatus, wherein the same is designed to be located permanently at one position, is indicated in Fig. 6 of the drawings. The cabinet 70 in this embodiment is of the lectern or desk type with the screen 71 closing window 72 located in a plane somewhat inclined to the horizontal; and the control box 73 is associated directly with the cabinet and located at some position conveniently accessible. Furthermore, the rheostat may be controlled by a pedal member or the like 74 to regulate the speed of advancement of the film.

I claim:

1. Apparatus for prompting speakers and actors, comprising the combination with a housing provided with a window and translucent screen closing the same, the said housing enclosing suitable projector apparatus for projecting upon the screen reproducible matter from a strip bearing the same, a feed reel for the strip and a take-up reel for the same contained within the housing, an electric motor and intermediate mechanism for advancing in either direction the strip between said reels to the projector; of control means connected with said motor and its transmission means for regulating the operation of the motor to effect the starting and stopping thereof and its speed of operation and the said control means including also means for changing the relationship of the intermediate mechanism to effect the desired direction of travel of the strip bearing the reproducible matter, together with a movable platform, and jacks supporting the housing thereon, and manual means for operating simultaneously said jacks to move the housing vertically with respect to said platform for adjusting the level of the screen.

2. Apparatus for prompting speakers and actors, comprising the combination with projector apparatus for projecting upon a screen reproducible matter from a strip bearing the same, a feed reel for the strip and a take-up reel for the same, a single electric motor continuously operating in one direction and intermediate mechanism mechanically connected with the motor for advancing by said motor in either direction the strip between said reels to the projector; of manually controlled means electrically connected with said motor and with its intermediate transmission mechanism for regulating the operation of the motor to effect the starting and stopping thereof and its speed of operation, and the said intermediate mechanism including also means electrically connected with the manually controlled means for changing the relationship of said intermediate mechanism to effect the desired direction of travel of the strip bearing the reproducible matter.

3. Apparatus for prompting speakers and actors, comprising the combination with projector apparatus for projecting upon a screen reproducible matter from a strip bearing the same, a feed reel for the strip and a take-up reel for the same, a single electric motor continuously operating in one direction and intermediate mechanism mechanically connected with the motor for advancing by said motor in either direction the strip between said reels to the projector and in one direction at a velocity different from that in the opposite direction; of manually controlled means electrically connected with said motor and with its intermediate transmission mechanism for regulating the operation of the motor to effect the starting and stopping thereof and its speed of operation, and the said intermediate mechanism including also means electrically connected with the manually controlled means for changing the relationship of said intermediate mechanism to effect the desired direction of travel of the strip bearing the reproducible matter.

4. Apparatus for prompting speakers and actors, comprising the combination with projector apparatus for projecting upon a screen reproducible matter from a strip bearing the same, a feed reel for the strip and a take-up reel for the same, a single electric motor continuously operating in one direction and intermediate mechanism mechanically connected with the motor for advancing by said said motor in either direction the strip between said reels to the projector; of manually controlled means electrically connected with said motor and with its intermediate transmission mechanism for regulating the operation of the motor to effect the starting and stopping thereof and its speed of operation, and the said intermediate mechanism including also an electromagnetically actuated element operated from the manually controlled means for changing the relationship of said intermediate mechanism to effect the desired direction of travel of the strip bearing the reproducible matter.

ERNEST A. TROEGER.